(12) United States Patent
Gardner et al.

(10) Patent No.: US 11,585,714 B2
(45) Date of Patent: Feb. 21, 2023

(54) OIL FILL TRANSDUCER WITH RUBBER DISC FOR DYNAMIC PROTECTION

(71) Applicant: KULITE SEMICONDUCTOR PRODUCTS, INC., Leonia, NJ (US)

(72) Inventors: Robert Gardner, Westwood, NJ (US); Louis DeRosa, Saddle River, NJ (US); Richard Martin, Ridgewood, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 0 days.

(21) Appl. No.: 17/363,286

(22) Filed: Jun. 30, 2021

(65) Prior Publication Data
US 2023/0003599 A1 Jan. 5, 2023

(51) Int. Cl.
*G01L 19/06* (2006.01)
*G01L 19/00* (2006.01)
*G01L 13/02* (2006.01)

(52) U.S. Cl.
CPC ........ *G01L 19/0645* (2013.01); *G01L 13/025* (2013.01); *G01L 19/0038* (2013.01)

(58) Field of Classification Search
None
See application file for complete search history.

(56) References Cited

U.S. PATENT DOCUMENTS

| | | | |
|---|---|---|---|
| 10,488,284 B2* | 11/2019 | Jentoft | ............ G01L 1/02 |
| 2007/0095146 A1* | 5/2007 | Brosh | ........... G01L 27/005 |
| | | | 73/722 |
| 2018/0136063 A1* | 5/2018 | Wagner | ......... G01L 13/026 |
| 2019/0003914 A1* | 1/2019 | Andrew | ......... G01L 19/0069 |
| 2020/0003649 A1* | 1/2020 | Kachenko | ......... G01L 19/0046 |

* cited by examiner

*Primary Examiner* — Lisa M Caputo
*Assistant Examiner* — Nigel H Plumb
(74) *Attorney, Agent, or Firm* — Troutman Pepper Hamilton Sanders LLP; James E. Schutz; Mark Lehi Jones

(57) ABSTRACT

An oil-fill pressure transducer including a flexible member configured to protect an isolation diaphragm and sensing element. The pressure transducer includes a sensing element mounted to the header, an isolation diaphragm mounted on the front side of the header, and adjacent to the sensing element such that an oil-fill cavity is defined between the sensing element and the isolation diaphragm. The flexible member is disposed adjacent to the isolation diaphragm and a retention member is disposed adjacent to the flexible member. A cavity in communication with the retention member is configured to transmit pressure media to the isolation diaphragm via the flexible member. The flexible member can include thru-holes. The flexible member may compress under an applied positive pressure change. The flexible member may temporarily separate from at least a portion of the isolation diaphragm under an applied negative pressure change.

18 Claims, 4 Drawing Sheets

OIL FILL TRANSDUCER WITH RUBBER DISC FOR DYNAMIC PROTECTION

FIELD

The disclosed technology concerns pressure transducers, and in particular, embodiments disclosed herein relate to oil-filled pressure transducers having an isolation diaphragm that is protected by a flexible member such as a rubber disc.

BACKGROUND

Pressure transducers are often utilized in gas turbine engines and other systems to measure the pressure of the media such as fluids, gasses, etc. In certain pressure measurement applications, it may be desirable to measure the pressure level of the media while avoiding or minimizing the damage of the transducer due to pressure ripples and/or fluctuations. Pumping equipment, for example, can cause pressure ripples in the measurement media that can adversely impact the measurement accuracy and/or lifespan of the pressure transducer.

An oil-filled capsule surrounding the pressure sensing element can protect the sensor from debris and enable the transducer to be used with almost any pressure media. However, when there are rapid pressure pulsations on the order of 1000's of psi per millisecond, especially in liquid media, such pressure changes can cause unwanted effects such as cavitation and suction near the oil fill isolation diaphragm. Since the diaphragm is typically very thin, such phenomena can cause the isolation diaphragm to rip or rupture and fail.

An internal cavity and/or other mechanical properties of the pressure transducer can result in a structure with a resonant frequency. Subjecting the pressure transducer to pressure ripples having frequencies that match the transducer's structural resonances can damage or reduce the lifespan of the pressure transducer. In these cases, a filter assembly may be placed at the inlet end of the transducer to eliminate the higher frequency ripples and leave static and quasi-static pressures intact. As discussed in U.S. Pat. Nos. 7,975,552, 9,500,533, 9,709,450, and 9,752,948, each assigned to Kulite Semiconductor Products, Inc. and incorporated herein by reference as presented in full, various filters have been designed for coupling with a pressure transducer to reduce resonances near the frequency of the pressure ripple.

U.S. Pat. No. 10,330,553, also assigned to Kulite Semiconductor Products, Inc. and incorporated herein by reference as presented in full, discloses mechanical filtering, for example, that can attenuate certain pressure oscillation frequencies, and block particulates. Such filtering techniques work well for certain applications and pressure media, but they can also cause an increase in the size of the transducer size, increase the likelihood of clogging, and can change the transducer frequency response.

Since pressure ripple frequencies can change from system to system, pressure transducers that are specifically designed for each unique system can be costly, impractical, and can lack the flexibility needed for a wide range of applications. Thus, there is a need for a pressure transducer assembly that can be utilized with multiple systems and applications to protect against rapid pressure pulsations.

BRIEF SUMMARY

A pressure transducer having a flexible member for protection is disclosed herein. The pressure transducer includes a header, a sensing element mounted to the header, an isolation diaphragm mounted on a front side of the header and adjacent to the sensing element, an oil-fill cavity disposed between the sensing element and the isolation diaphragm, a flexible member disposed adjacent to the isolation diaphragm and configured to protect the isolation diaphragm, a retention member disposed adjacent to the flexible member, and a cavity in communication with the retention member and configured to transmit a pressure media to the isolation diaphragm via the flexible member. In certain implementations, the retention member can comprise a screen having one or more thru-holes.

A method of assembling a pressure transducer for dynamic pressure protection is disclosed herein. The method includes mounting a sensing element to a recessed portion of a header, securing an isolation diaphragm to the header adjacent to the sensing element such that an oil-fill cavity is formed between the sensing element and the isolation diaphragm, installing a flexible member adjacent to the isolation diaphragm, wherein the flexible member is configured to protect the isolation diaphragm, securing a retention member to an edge portion of the header adjacent to the flexible member, wherein the retention member constrains at least an edge portion of the flexible member against the header, and securing the header to a sensor housing such that a cavity is formed adjacent to the retention member, wherein the cavity configured to transmit a pressure media from an inlet port of the sensor housing to the isolation diaphragm via the flexible member. In certain implementations, the retention member can comprise a screen having one or more thru-holes.

In accordance with certain example implementations of the disclosed technology, the flexible member may be shaped in the form of a flexible disc, which in certain embodiments, may include thru-holes to transmit pressure media to the isolation diaphragm. The flexible member may be utilized to substantially reduce high-frequency pressure ripples and allow static and quasi-static pressures to pass through to the sensing element.

In certain example implementations, the flexible member may be custom-tuned to achieve the desired dampening frequency. The various embodiments of the flexible disc may protect the pressure transducer assembly in many different systems, with various pressure media, over a wide range of pulsation frequencies, and/or over a wide range of applied pressure.

DETAILED DESCRIPTION

Figure 1:
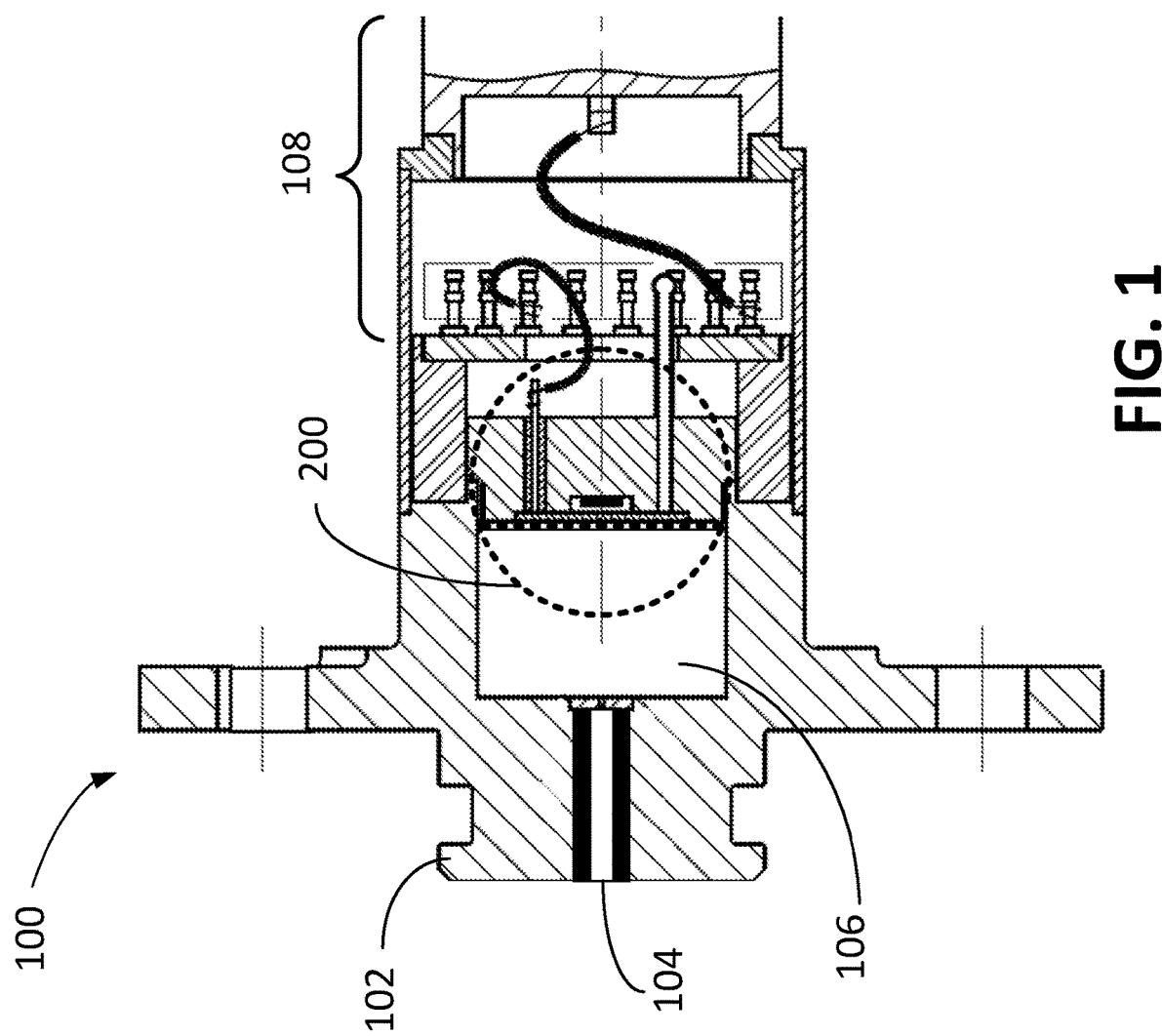
FIG. 1 illustrates a cross-sectional side view of an exemplary pressure transducer assembly 100 with a sensing element region 200 as will be discussed with reference to FIG. 2.

Exemplary embodiments of the disclosed technology provide for a compact, oil-filled transducer that can withstand high slew rate pressure pulsations. In certain exemplary implementations a flexible member, such as a rubber disc, may be disposed adjacent to and/or in contact with an isolation diaphragm of an oil-filled cavity that is in communication with a sensing element of the transducer. When pressure media enters the input channel of the transducer, the rubber disc may contract and/or expand according to the applied pressure to protect the isolation diaphragm.

In accordance with certain example implementations, the disclosed technology may enable mass production of pressure transducer housings with the same or similar structural dimensions that may be tuned by the selection of the flexible member. Certain example implementations of the disclosed technology may enable the pressure transducer assembly to be used for a wide variety of pressure ripple amplitudes and frequencies.

Although preferred embodiments of the disclosed technology are explained in detail, it is to be understood that other embodiments are contemplated. Accordingly, it is not intended that the disclosed technology is limited in its scope to the details of construction and arrangement of components outlined in the following description or illustrated in the drawings. The disclosed technology is capable of other embodiments and of being practiced or carried out in various ways. Also, in describing the preferred embodiments, specific terminology will be resorted to for the sake of clarity.

Referring now to the drawings, in which like numerals represent like elements, exemplary embodiments of the disclosed technology are herein described. It is to be understood that the figures and descriptions of the disclosed technology have been simplified to illustrate elements that are relevant for a clear understanding of the disclosed technology, while eliminating, for purposes of clarity, many other elements found in typical pressure transducer assemblies and methods of making and using the same. Those of ordinary skill in the art will recognize that other elements are desirable and/or required to implement the disclosed technology. However, because such elements are well known in the art, and because they do not facilitate a better understanding of the disclosed technology, a discussion of such elements is not provided herein.

FIG. 1 illustrates a cross-sectional side view of an exemplary pressure transducer assembly 100 with a sensing element region 200 as will be discussed with reference to FIG. 2. In general, the pressure transducer assembly 100 can include body 102 configured for sealed attachment to a pressure port of an external device so that pressure media may enter an inlet port 104 of the pressure transducer and be sensed by a pressure sensor in the sensing element region 200. In certain implementations, the pressure transducer assembly 100 may include a cavity 106 in communication with the inlet port 104. In accordance with certain exemplary implementations of the disclosed technology, the dimensions of the inlet port 104 and/or the dimensions of the cavity 106 may be designed to control pressure oscillation resonances and/or dampen certain pressure transients communicated to the pressure sensor via the pressure media, as discussed in U.S. Pat. Nos. 7,975,552, 9,500,533, 9,709,450, 9,752,948, and/or 10,330,553 each assigned to Kulite Semiconductor Products, Inc. and incorporated herein by reference as presented in full.

In certain implementations, the pressure transducer assembly 100 may include a back end 108 configured to house connectors, electrical circuits, etc. It should be understood that the pressure transducer assembly 100 depicted in FIG. 1 is provided as a contextual example, and it may be configured in many different shapes and sizes without departing from the scope of the disclosed technology.

Figure 2:
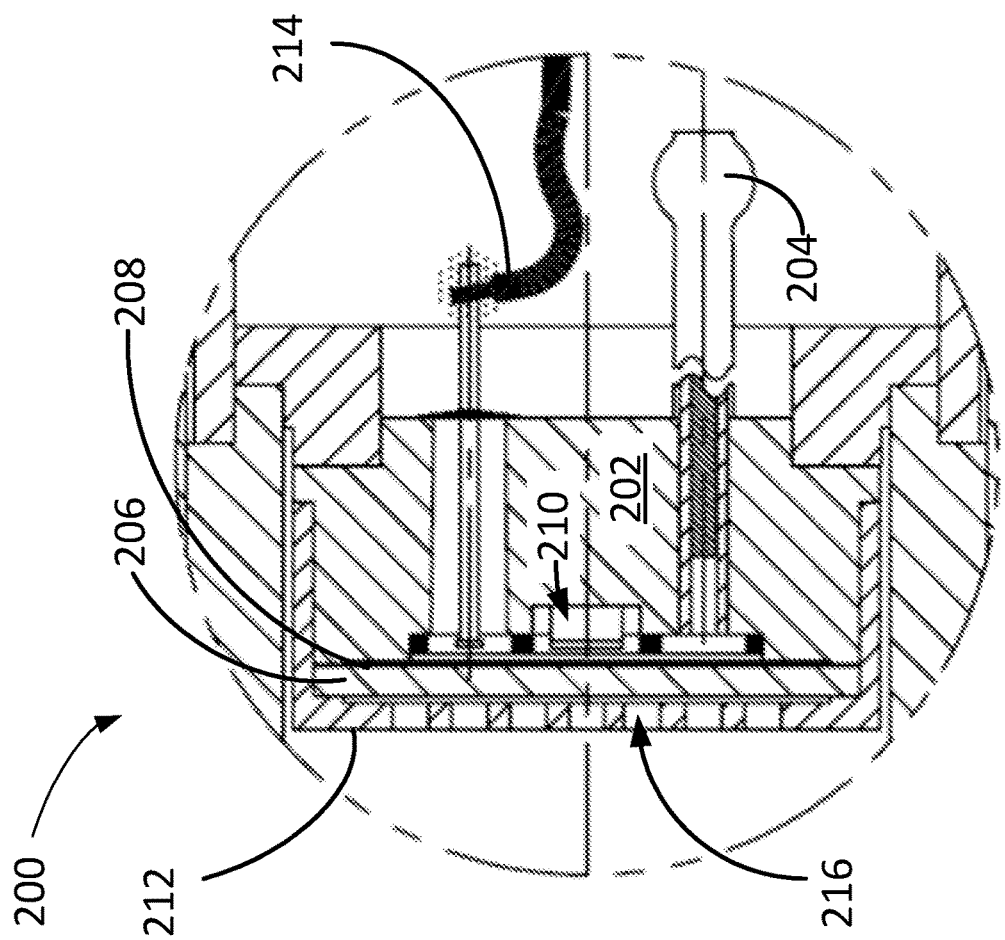
FIG. 2 illustrates a cross-sectional side view of a sensing element region 200 of a pressure transducer assembly having a flexible member 206 for protection, in accordance with exemplary embodiments of the disclosed technology.

FIG. 2 illustrates a cross-sectional side view of a sensing element region 200 of a pressure transducer assembly (such as depicted in the inset of FIG. 1) having a flexible member 206 for protection, in accordance with exemplary embodiments of the disclosed technology. A header 202 may be utilized to house and/or support a sensing element 210. In certain exemplary embodiments, an oil fill tube 204 may be utilized to add oil to a small cavity between the sensing element 210 and an isolation diaphragm 208 that may be welded to the header 202. Once the oil is added, the oil fill tube 204 may be sealed to create a sealed oil-filled cavity. In this respect, the pressure exerted on the isolation diaphragm 208 by the pressure media may be transferred through the oil cavity to the sensing element 210 so that the sensing element 210 is isolated from the pressure media. In certain implementations, electrical leads 214 may be utilized to connect the sensing element 210 with a connector on the backside of the transducer for measurement by external equipment. In some implementations, header pins may be utilized between the sensing element 210 and the electrical lead(s) 214.

Figure 3B:
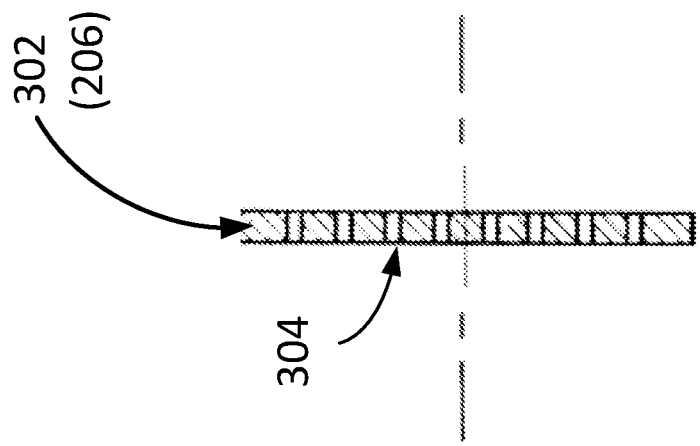
FIG. 3B illustrates a cross-sectional side view of an exemplary perforated flexible disc 302, in accordance with exemplary embodiments of the disclosed technology.

In accordance with certain exemplary implementations of the disclosed technology, a flexible member 206 (such as a rubber disc as will be discussed below with reference to FIG. 3A and FIG. 3B) may be placed against the outer edge of the header 202 and against the isolation diaphragm 208. A retention member 212 may then be installed so that the flexible member 206 is sandwiched between the edge of the header and the retention member 212. In one exemplary implementation of the disclosed technology, the retention member 212 may be welded to the header. In other exemplary implementations, the retention member 212 may be attached to secure the flexible member 206 using screws and/or a retaining ring and to allow for the replacement of the flexible member 206. In certain implementations, the flexible member 206 may be supported only at the edges where the retention member 212 compresses the flexible member 206 against the header 202.

In certain exemplary implementations, the retention member 212 may be embodied as a screen having a plurality of screen thru-holes that allow pressure media to pass therethrough while securing the edges of the flexible member 206 against the header 202. In some implementations, the retention member 212 may include a single aperture to allow the pressure media to pass therethrough.

In accordance with certain exemplary implementations of the disclosed technology, the retention member 212 and/or the flexible member 206 may be configured to allow room to expand outward if the media pressure media causes it to swell. In practice, when the pressure media (having a net positive pressure) is introduced to the flexible member 206 via one or more apertures in the retention member 212, it may put pressure on the flexible member 206 and cause it to compress slightly due to the pressure, but the flexible member 206 may generally stay in contact with the isolation diaphragm 208 to transmit applied pressure because the flexible member 206 may be forced against the isolation diaphragm 208 by the positive pressure. In certain implementations, the edges of the retention member 212 may be configured to squeeze the flexible member 206 enough against the header 202 to create a seal so that the pressure media does not get between the flexible member 206 and the isolation diaphragm 208. If the pressure in the pressure media drops suddenly, the flexible member 206 may expand and may pull away from the isolation diaphragm 208. Since the flexible member 206 is only placed against the isolation diaphragm 208 (without adhesive) and is held in place by the edges of the retention member 212, the flexible member 206 can pull away from the isolation diaphragm 208 and leave the isolation diaphragm 208 intact. In this respect, the flexible member 206 can act as a shock absorber for protecting the isolation diaphragm 208.

In certain implementations, the retention member 212 may have multiple retention member thru-apertures 216 (i.e., perforations) defined in at least a central area of the retention member 212 so that pressure from the pressure media may be transmitted evenly across the flexible member 206. In certain implementations, the diameters of the retention member thru-apertures 216 may be configured to avoid clogging by particulates in the pressure media.

In accordance with certain exemplary implementations, the flexible member 206 may comprise a rubber. In certain implementations, the flexible member 206 may comprise one or more of EPDM rubber, silicon, Neoprene, Viton, natural rubber, synthetic rubber, elastomer, nitrile, butyl, Timprene, foam, sponge rubber, flexible PVC, thermoplastic elastomer, ManniGlas, FiberFrax, and/or other flexible material. In certain implementations, the flexible member 206 may be embodied as a disc.

Different types of thickness for the flexible member 206 may be chosen depending on the intended media and pressure range. The thickness of the flexible member 206 may generally range from about 0.5 millimeters to about 5 millimeters. Other thicknesses of the flexible member 206 may be utilized without departing from the scope of the disclosed technology. In some implementations, for example, the thickness of the flexible member 206 may be configured in the range of about 300 microns to about 500 microns. In some implementations, the thickness of the flexible member 206 may be configured in the range of about 500 microns to about 1 millimeter. In certain implementations, the thickness of the flexible member 206 may be configured in the range of about 1 millimeter to about 2 millimeters. In some implementations the thickness of the flexible member 206 may be configured in the range of about about 2 millimeters to about 3 millimeters. In some implementations the thickness of the flexible member 206 may be configured in the range of about about 3 millimeters to about 4 millimeters. In some implementations the thickness of the flexible member 206 may be configured in the range of about about 4 millimeters to about 5 millimeters. In some implementations the thickness of the flexible member 206 may be configured in the range of about about 5 millimeters to about 7 millimeters.

In accordance with certain exemplary implementations of the disclosed technology, the flexible member 206 may cause high-frequency signals to be dampened or distorted. However, in certain applications where the transducer is used to measure static or quasi-static pressure, such high-frequency distortions may be electronically filtered out.

Figure 3A:
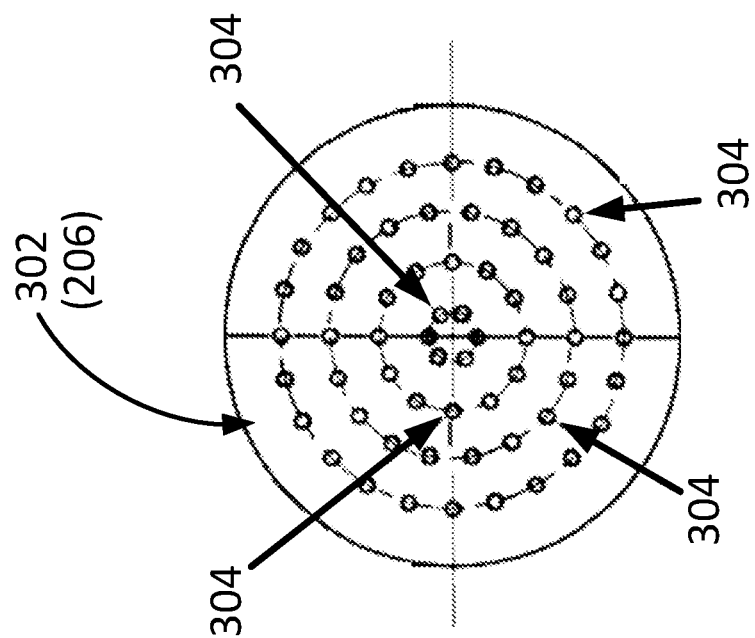
FIG. 3A illustrates a front-end view of an exemplary perforated flexible disc 302, in accordance with exemplary embodiments of the disclosed technology.

FIG. 3A illustrates a front-end view of an exemplary flexible member 206 embodied as a perforated flexible disc 302, in accordance with exemplary embodiments of the disclosed technology. FIG. 3B illustrates a cross-sectional side view of an exemplary flexible member 206 embodied as a perforated flexible disc 302, in accordance with exemplary embodiments of the disclosed technology. The perforated flexible disc 302 may be installed between the retention member 212 and the isolation diaphragm 208 in the transducer assembly 100 (similar to the flexible member 206) as discussed above with reference to FIG. 1 and FIG. 2. However, in this implementation, the perforated flexible disc 302 may be more tightly constrained and may have flexible member thru-apertures 304 that correspond to the retention member thru-apertures 216. In certain exemplary implementations, the retention member 212 may include a single, large central aperture that allows pressure media to exert force on most of the the flexible member 206. In some implementations, the central aperture of the retention member 212 may be large enough that the pressure media may impinge directly on each of the flexible member thru-apertures 304 (and the flexible member 206 material between the apertures 304). Yet in other example implementations, the retention member 212 may be configured as a screen having a plurality of thru-apertures 216. In the screen embodiment, the retention member 212 may provide some added protection for the isolation diaphragm 208 and/or support for the flexible disc 302 against the isolation diaphragm 208.

In certain implementations, it may not be an intended function of the perforated flexible disc 302 to transmit the applied pressure to the isolation diaphragm 208 directly, but rather, via the pressure media which may pass through both the retention member thru-apertures 216 and the flexible member thru-apertures 304. In this implementation, the perforated flexible disc 302 may help prevent the isolation diaphragm from deflecting towards the retention member 212 when there is a large negative pressure applied in the pressure media. This embodiment may be particularly useful in applications such as reciprocating compressors, where very large and repeated pressure drops can occur. Such applications can tend to rip isolation diaphragms as the pressure of the media falls much more quickly than the pressure inside the oil fill cavity, so there can be a large negative force exerted on the isolation diaphragm 208. This embodiment allows the perforated flexible disc 302 to create a positive force to cancel or reduce such negative force effects from the pressure media.

As discussed above, pressure media being measured can comprise pressure ripples that can interfere with the accuracy of the sensing element 210 and/or shorten its operable lifespan. The pressure transducer assembly 100 disclosed herein may be tuned by selection of the flexible member 206 material, thickness, and/or perforations to achieve desired parameters, for example, to eliminate undesirable high-frequency ripples and/or large negative pressure spikes, while allowing desirable static and quasi-static pressures to pass and be measured by the sensing element 210.

According to certain exemplary implementations of the disclosed technology, one or more of the retention member thru-apertures 216 and/or the flexible member thru-apertures 304 of the perforated flexible disc 302 may be machined using various techniques, including but not limited to laser drilling, mechanical drilling, electrical discharge machining (EDM) drilling, etc.

Different flexible member thru-apertures 304 may be chosen depending on the intended media and pressure range. In certain exemplary implementations, the flexible member thru-apertures 304 of the flexible member 206 (such as the perforated flexible disc 302) may be configured (drilled, etc.) so that the resulting hole diameters generally result in the range of about 0.5 millimeters to about 5 millimeters. Other aperture 304 diameters of the flexible member 206 may be utilized without departing from the scope of the disclosed technology. In certain exemplary implementations, for example, the thru-apertures 304 of the flexible member 206 may be configured so that the resulting hole diameters are in the range of about 300 microns to about 500 microns. In some implementations, the thru-aperture 304 diameters of the perforated flexible member 206 may be configured in the range of about 500 microns to about 1 millimeter. In certain implementations, the thru-aperture 304 diameters of the perforated flexible member 206 may be configured in the range of about 1 millimeter to about 2 millimeters. In some implementations the thru-aperture 304 diameters of the perforated flexible member 206 may be configured in the range of about about 2 millimeters to about 3 millimeters. In some implementations the thru-aperture 304 diameters of the perforated flexible member 206 may be configured in the range of about about 3 millimeters to about 4 millimeters. In some implementations thru-aperture 304 diameters of the perforated flexible member 206 may be configured in the range of about about 4 millimeters to about 5 millimeters. In some implementations thru-aperture 304 diameters of the perforated flexible member 206 may be configured in the range of about about 5 millimeters to about 7 millimeters. In this respect, the pressure transducer assembly 100 may be custom tuned by the selection and installation of the perforated flexible member 206 (such as the flexible disc 302) to achieve the desired protection and/or frequency response.

Referring again to FIG. 1 and FIG. 2, the pressure transducer assembly 100 disclosed herein may include a cavity 106 of fixed volume defined by the housing 102 and the header 202 and may be in communication with the retention member 212 of the flexible member 206. As discussed above, the retention member 212 may be embodied as a screen. According to an exemplary implementation of the disclosed technology, the sensing element 210 may be mounted on the header 202 and may be configured to measure an applied pressure of the pressure media. The volume of the cavity 106 may be set by the dimensions of the housing 102 and/or the header 202, thus providing additional manufacturable parameters that may be utilized to provide desired tuning specifications of the assembly 100.

Certain technical improvements, cost savings, and/or flexibility may be achieved by the disclosed technology. One skilled in the art will appreciate that the housing 102 and/or inlet port 104 can be customized to fit many configurations, for example, but not limited to, O-ring seals and threads.

Figure 4:
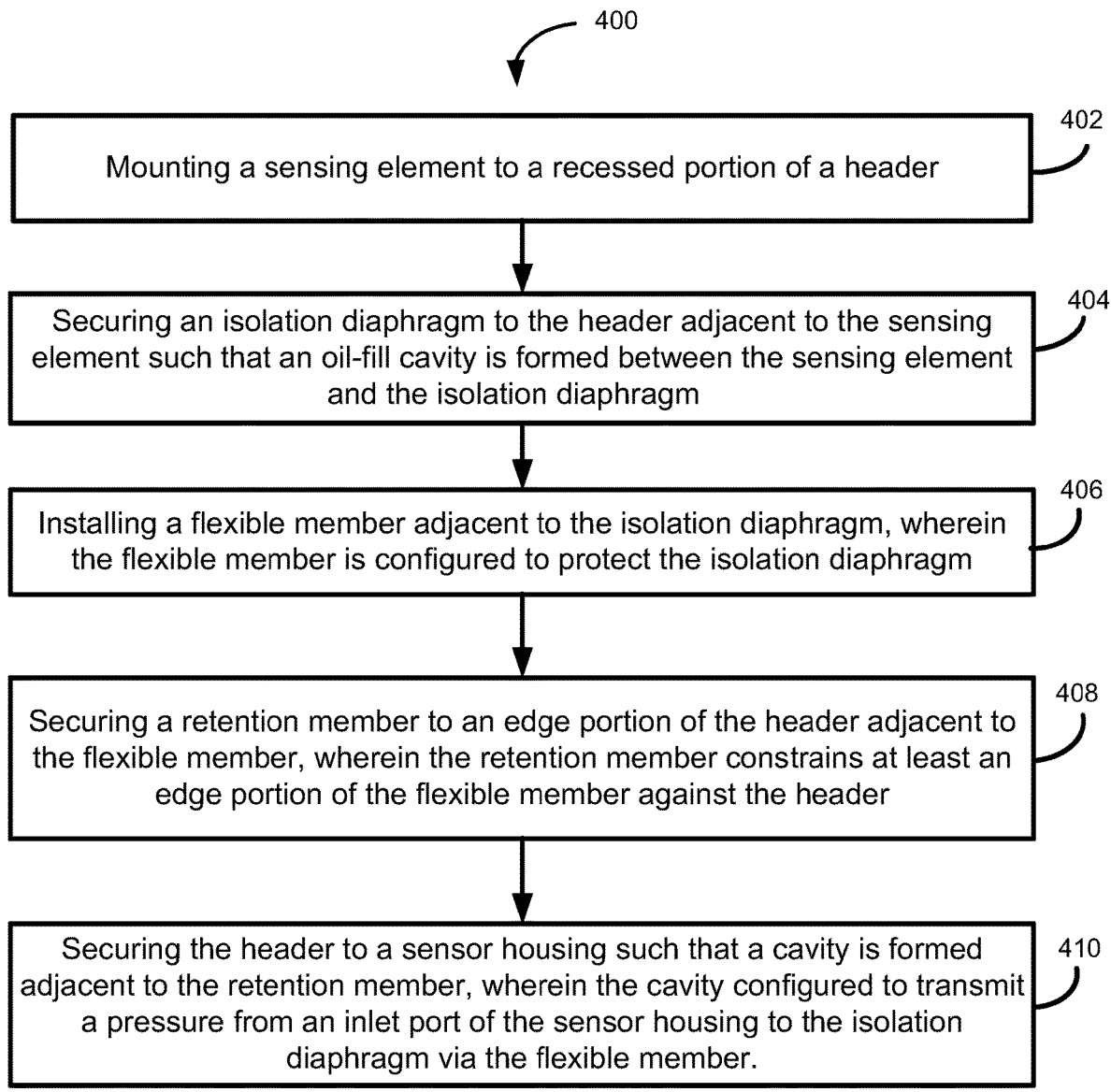
FIG. 4 is a flow diagram of a method 400, in accordance with exemplary embodiments of the disclosed technology.

FIG. 4 is a flow diagram of a method 400 of assembling a pressure transducer for dynamic pressure protection. In block 402, the method 400 includes mounting a sensing element to a recessed portion of a header. In block 404, the method 400 includes securing an isolation diaphragm to the header adjacent to the sensing element such that an oil-fill cavity is formed between the sensing element and the isolation diaphragm. In block 406, the method 400 includes installing a flexible member adjacent to the isolation diaphragm, wherein the flexible member is configured to protect the isolation diaphragm. In block 408, the method 400 includes securing a retention member to an edge portion of the header adjacent to the flexible member, wherein the retention member constrains at least an edge portion of the flexible member against the header. In block 410, the method 400 includes securing the header to a sensor housing such that a cavity is formed adjacent to the retention member, wherein the cavity is configured to transmit a pressure media from an inlet port of the sensor housing to the isolation diaphragm via the flexible member.

Certain implementations can include defining a one or more thru-holes in the flexible member to enable transmission of the pressure media to the isolation diaphragm.

In accordance with certain exemplary implementations of the disclosed technology, the flexible member may be shaped in the form of a disc. In some implementations, the flexible member may be shaped in square or rectangular form.

In certain implementations, the flexible member can include one or more of EPDM rubber, silicon, Neoprene, Viton, natural rubber, synthetic rubber, elastomer, nitrile, butyl, foam, sponge rubber, flexible PVC, thermoplastic elastomer, and/or similar flexible material.

In certain implementations, securing the retention member can include one or more of welding and fastening with a screw. In certain implementations, the retention member may constrain at least an edge portion of the flexible member against the header.

According to an exemplary implementation of the disclosed technology, installing a flexible member adjacent to the isolation diaphragm may cause the flexible member to removably contact the isolation diaphragm.

Certain implementations can further include defining a recessed cavity in the retention member and securing the retention member to the edge portion of the header so that the recessed cavity is disposed adjacent to the flexible member. In certain implementations, one or more retention member thru-holes may be configured to transmit a pressure media to one or more of the flexible member and the isolation diaphragm via the recessed cavity.

In certain implementations, the recessed cavity may be configured to allow the flexible member to temporarily separate from at least a portion of the isolation diaphragm under a negative pressure change in applied pressure.

Certain implementations can include installing an oil-fill tube in communication with the oil-fill cavity.

Certain implementations can include installing one or more header pins in the header and creating one or more corresponding electrical connections to the sensing element for outputting a pressure measurement signal.

Certain implementations can further include measuring, with the sensing element, an input pressure of a pressure medium, and outputting a signal corresponding to the measured input pressure.

In certain exemplary implementations, one or more frequencies associated with an input pressure may be selectively dampened by selecting the flexible member dimensions and/or material.

As used in the specification and the appended claims, the singular forms "a," "an," and "the" include plural referents unless the context clearly dictates otherwise. Also, in describing the preferred embodiments, the terminology has been utilized for the sake of clarity. It is intended that each term contemplates its broadest meaning as understood by those skilled in the art and includes all technical equivalents which operate in a similar manner to accomplish a similar purpose.

Ranges have been expressed herein as from "about" or "approximately" one particular value and/or to "about" or "approximately" another particular value. When such a range is expressed, an embodiment includes values from the one particular value (starting point) and/or to the other particular value (ending point). In certain embodiments, the term "about" signifies a buffer of +/−5% of the said range about each said starting point and/or ending point.

As used herein, the terms "comprising" or "containing" or "including" mean that at least the named element or method step is present in the composition or article or method, but does not exclude the presence of other compounds, materials, particles, method steps, even if the other such compounds, material, particles, method steps have the same function as what is named.

Numerous characteristics and advantages have been set forth in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as set forth in the following claims. Therefore, other modifications or embodiments as may be suggested by the teachings herein are particularly reserved as they fall within the breadth and scope of the claims here appended.

What is claimed is:

1. A pressure transducer, comprising:
a header;
a sensing element mounted to the header;
an isolation diaphragm mounted on a front side of the header and adjacent to the sensing element;
an oil-fill cavity disposed between the sensing element and the isolation diaphragm;
a flexible member disposed adjacent to the isolation diaphragm and configured to protect the isolation diaphragm;
a retention member disposed adjacent to the flexible member, the retention member comprising a plurality of retention member thru-holes and a retention member recessed cavity disposed adjacent to the flexible member, wherein the plurality of retention member thru-holes are configured to transmit a pressure media to one or more of the flexible member and the isolation diaphragm via the retention member recessed cavity; and
a cavity in communication with the retention member and configured to transmit the pressure media to the isolation diaphragm via the flexible member.

2. The pressure transducer of claim 1, wherein the flexible member comprises a plurality of flexible member thru-holes configured to transmit the pressure media to the isolation diaphragm.

3. The pressure transducer of claim 1, wherein the flexible member is shaped in the form of a disc.

4. The pressure transducer of claim 1, wherein the flexible member comprises one or more of EPDM rubber, silicon, Neoprene, Viton, natural rubber, synthetic rubber, elastomer, nitrile, butyl, foam, sponge rubber, flexible PVC, and thermoplastic elastomer.

5. The pressure transducer of claim 1, wherein the flexible member is secured to at least a portion of the header by the retention member, wherein the retention member constrains at least an edge portion of the flexible member against the header.

6. The pressure transducer of claim 1 wherein the retention member is secured to at least a portion of the header by one or more of a weld, a screw, and an adhesive, wherein the retention member constrains at least an edge portion of the flexible member against the header.

7. The pressure transducer of claim 1, wherein the flexible member is configured to contact the isolation diaphragm.

8. The pressure transducer of claim 1, wherein the retention member recessed cavity is configured to allow the flexible member to separate from at least a portion of the isolation diaphragm under a negative pressure change in the pressure media.

9. The pressure transducer of claim 1 further comprising an oil-fill tube configured for adding oil to the oil-fill cavity.

10. A method of assembling a pressure transducer for dynamic pressure protection, the method comprising:
mounting a sensing element to a recessed portion of a header;
securing an isolation diaphragm to the header adjacent to the sensing element such that an oil-fill cavity is formed between the sensing element and the isolation diaphragm;
installing a flexible member adjacent to the isolation diaphragm, wherein the flexible member is configured to protect the isolation diaphragm;
securing a retention member to an edge portion of the header adjacent to the flexible member, wherein the retention member constrains at least an edge portion of the flexible member against the header, and wherein the retention member comprises a plurality of retention member thru-holes and a retention member recessed cavity;
securing the retention member to the edge portion of the header so that the recessed cavity is disposed adjacent to the flexible member, wherein the plurality of retention member thru-holes are configured to transmit a pressure media to one or more of the flexible member and the isolation diaphragm via the recessed cavity; and
securing the header to a sensor housing such that a cavity is formed adjacent to the retention member, wherein the cavity configured to transmit the pressure media from an inlet port of the sensor housing to the isolation diaphragm via the flexible member.

11. The method of claim 10, further comprising defining a plurality of flexible member thru-holes in the flexible member to enable transmission of the pressure media to the isolation diaphragm.

12. The method of claim 10, wherein the flexible member is shaped in the form of a disc.

13. The method of claim 10, wherein the flexible member comprises one or more of EPDM rubber, silicon, Neoprene, Viton, natural rubber, synthetic rubber, elastomer, nitrile, butyl, foam, sponge rubber, flexible PVC, and thermoplastic elastomer.

14. The method of claim 10, wherein securing the retention member comprises one or more of welding and fastening with a screw, wherein securing the retention member constrains at least an edge portion of the flexible member against the header.

15. The method of claim 10, wherein installing a flexible member adjacent to the isolation diaphragm causes the flexible member to removably contact the isolation diaphragm.

16. The method of claim 10, wherein the retention member recessed cavity is configured to allow the flexible member to temporarily separate from at least a portion of the isolation diaphragm under a negative pressure change in applied pressure.

17. The method of claim 10, further comprising installing an oil-fill tube in communication with the oil-fill cavity.

18. The method of claim 10, further comprising installing one or more header pins in the header and creating one or more corresponding electrical connections to the sensing element for outputting a pressure measurement signal.

* * * * *